United States Patent [19]

Marks

[11] Patent Number: 5,270,437
[45] Date of Patent: Dec. 14, 1993

[54] PROCESS FOR MAKING PARTIALLY AROMATIC POLYAMIDES CONTAINING 2-METHYLPENTAMETHYLENEDIAMINE UNITS

[75] Inventor: David N. Marks, Wilmington, Del.

[73] Assignee: E. I. Du Pont de Nemours and Company, Wilmington, Del.

[21] Appl. No.: 979,006

[22] Filed: Nov. 13, 1992

[51] Int. Cl.$^5$ .............................................. C08G 69/28
[52] U.S. Cl. .................................... 528/336; 528/340; 528/347; 528/349
[58] Field of Search ................ 528/336, 347, 349, 340

[56] References Cited

U.S. PATENT DOCUMENTS 4,219,636  8/1980  Nielinger et al. .................... 528/336
5,109,106  4/1992  Lahary et al. ....................... 528/336

Primary Examiner—Harold D. Anderson

[57] ABSTRACT

Polymers of aromatic diacids and 2-methylpentamethylenediamine are prepared in the presence of formic acid. The formic acid reduces the tendency of the 2-methylpentamethylenediamine to cyclize.

6 Claims, No Drawings

PROCESS FOR MAKING PARTIALLY AROMATIC POLYAMIDES CONTAINING 2-METHYLPENTAMETHYLENEDIAMINE UNITS

FIELD OF THE INVENTION

This invention relates to the preparation of partially aromatic polyamides containing polymerized 2-methylpentamethylenediamine units.

BACKGROUND OF THE INVENTION

During polymerizations with aromatic diacids, 2-methylpentamethylenediamine cyclizes to 3-methylpiperidine. 3-Methylpiperidine is incorporated into the polymer as an end capper which reduces the polymer molecular weight. Also the cyclization reaction leads to a significant loss of diamine (3-5%) during the polymerization. The addition of formic acid at the beginning of the polymerization significantly reduces cyclization of 2-methylpentamethylenediamine. With formic acid present a higher molecular weight polymer can be made with less yield loss to 3-methylpiperidine.

Polymers of 2-methylpentamethylenediamine and aromatic diacids, such as with hexamethylenediamine and terephthalic acid, have higher melting points, better high temperature properties and better dimensional stability than nylon 66. It is difficult to make these polymers with a satisfactory molecular weight because of the cyclization reaction and incorporation of 3-methylpiperidine as an end capper. A large excess (about 4%) of 2-methylpentamethylenediamine is required because of the extent of cyclization.

DESCRIPTION OF THE PRIOR ART

Polymers of aromatic acids and 2-methylpentamethylenediamine are disclosed in Barthehemy U.S. Pat. Nos. 4,937,322 and 4,937,315. U.S. Pat. No. 5,109,106 to Lahary et al discloses a process for the preparation of polymers of 2-methylpentamethylenediamine and terephthalic acid, and points out the cyclization problem. The extent of the cyclization problem is reduced in this '106 patent by controlling the reaction conditions in a particular manner.

U.S. Pat. No. 2,562,797 adds formic acid as a polycondensation accelerator for the polymerization of caprolactam.

SUMMARY OF THE INVENTION

The present invention is a process for the preparation of high molecular weight partially aromatic polyamide which comprises (a) forming a reaction mixture containing
  at least one aromatic diacid;
  at least a stoichiometric amount, based on the amount of aromatic diacid, of diamine component;
  at least a portion of the diamine component being 2-methylpentamethylenediamine, said 2-methylpentamethylenediamine being present in the diamine component in the amount of at least mole 10%; and
  formic acid, said formic acid being present in the reaction mixture in an amount of between about 0.08 and 8.0% by weight of the weight of monomers present in the reaction mixture,
and (b) reacting the mixture at a temperature in the final stage of polymerization above 280 degrees C.

DETAILED DESCRIPTION OF THE INVENTION

The cyclization of 2-methylpentamethylenediamine is only a problem in the polymerization with aromatic diacids. Terephthalic acid and isophthalic acid are particularly useful as diacids in forming such polymers, but other aromatic acids such as those disclosed in the Lahary et al patent i.e. aromatic dicarboxylic acids of 8 to 18 carbon atoms, may also be employed.

It is not necessary that the 2-methylpentamethylenediamine be the only diamine in the reaction mixture. Hexamethylenediamine or other alkyldiamines may form a portion of the reaction mixture. The problem of cyclization is relatively insignificant if the amount of 2-methylpentamethylenediamine is less than about 10 mole percent of the diamine in the reaction mixture.

As little as 0.1 wt. percent of formic acid in the mixture of monomers is sufficient to show improved results, while as much as 10 wt. percent seems to be about the maximum amount needed.

Since the diacid and the diamine condense in alternating units, at least about a stoichiometric amount of diamine should be present in the reaction mixture. Since even with the addition of formic acid, some cyclization takes place, and since diamine tends to be the more volatile component in the reaction mixture, it is preferred to have diamine present at the beginning of the reaction in amount of about 1 to 4 wt. percent more than the stoichiometric amount.

The reaction mixture may contain a catalyst such as an oxygenated phosphorus acid or a salt of an oxygenated phosphorus acid.

The polymerization process is conducted in the usual manner, except the final polymerization temperature is raised to at least about 280 degrees C. This high temperature causes the formic acid to decompose. If the formic acid is not decomposed, some if it will form end caps on the polymer.

The polymerization pressure is controlled so that the polymer does not freeze during polymerization. Pressures of at least about 18 atmospheres are employed.

DETAILED EXAMPLE

1. A 300 cc stainless steel autoclave was charged with 34.2 grams of terephthalic acid, 14.8 grams of 2-methylpentamethylenediamine, 12.0 grams of 82.04% aqueous hexamethylenediamine, 40 grams of water, 2.0 grams of formic acid and 0.1 sodium phenylphosphinate.

2. A regulator controlling the pressure in the system was set for 350 psig; i.e. pressure will build-up in the system to 350 psig and then vapor will be released through this regulator to control the pressure at this setting.

3. The autoclave was closed and purged several times with 20 psig of nitrogen to purge air from the system.

4. The contents of the autoclave were agitated and heated in 60 minutes to 275 degrees C. Heat was supplied by an electric band heater surrounding the autoclave. The temperature was controlled. The temperature was measured with a thermocouple inserted through the bottom of the autoclave.

5. After reaching 275 degrees C., the pressure in the system was reduced from 350 psig to atmospheric pressure over one hour by adjusting the pressure regulator. During the pressure reduction the temperature was increased to 310 degrees C.

6. The pressure was reduced under vacuum to 260 mm absolute pressure in 5 minutes. The polymer was heated at 310 degrees C. and 260 mm for 15 minutes.

7. The heat and the agitation on the autoclave were turned off. The contents of the autoclave were cooled under 2 psig nitrogen.

8. After cooling, the polymer was removed in a block from the autoclave and crushed. The polymer was dried at 90 degrees C. under vacuum. The relative viscosity (RV) of a solution containing 0.25 grams of polymer and 50 ml of sulfuric acid was 1.73. The inherent viscosity (IV) was calculated to be 1.10. Without formic acid the polymer IV was 0.82. This example is item 8 in the table below. The table below shows the results of other polymerization runs.

TABLE

| Run | Monomers | Catalyst | % formic ****** | excess diamine | IV |
|---|---|---|---|---|---|
| 1 | MPMD*,T** | none | none | 4.9% | 0.86 |
| 2 | MPMD,T | SPPA*** | 3.2% | 3.7% | 1.00 |
| 3 | MPMD,T | " | " | 2.8% | 0.96 |
| 4 | MPMD,T | " | none | 4.5% | 0.63 |
| 5 | MPMD,T | none | 3.2% | 4.5% | 0.70 |
| 6 | MPMD,T | none | 3.2% | 2.8% | 0.77 |
| 7 | MPMD,T,6****,T | SPPA | none | 3.0% | 0.82 |
| 8 | MPMD,T,6 | " | 3.2% | 3.0% | 1.10 |
| 9 | MPMD,T,6 | " | 0.32% | 3.0% | 0.88 |
| 10 | MPMD,T,6 | " | 0.08% | 3.0% | 0.82 |
| 11 | MPMD,T,6 | " | 8% | 1.1% | 1.12 |
| 12 | MPMD,I***** | " | none | 3.7% | 0.49 |
| 13 | MPMD,I | " | 3.2% | 3.7% | 0.67 |

RUNS 1,4,7 AND 12 ARE CONTROL EXAMPLES AND NOT EXAMPLES OF THE INVENTION, BECAUSE NO FORMIC ACID WAS ADDED.
*2-methylpentamethylenediamine
**terephthalic acid
***sodium phenylphosphinate
****hexamethylenediamine
*****isophthalic acid
IV is the inherent viscosity.
******% formic acid relative to the weight of the monomers in the reaction mixture.

I claim:

1. A process for the preparation of high molecular weight partially aromatic polyamide which comprises
(a) forming a reaction mixture containing
    at least one aromatic diacid;
    at least a stoichiometric amount, based on the amount of aromatic diacid, of diamine component;
    at least a portion of the diamine component being 2-methylpentamethylenediamine, said 2-methylpentamethylenediamine being present in the diamine component in the amount of at least mole 10%; and
    formic acid, said formic acid being present in the reaction mixture in an amount of between about 0.1 and 10.0% by weight of the weight of monomers present in the reaction mixture,
and (b) reacting the mixture at a temperature of polymerization above 280 degrees C.

2. The process of claim 1 in which the aromatic diacid is selected from the group consisting of terephthalic acid and isophthalic acid.

3. The process of claim 1 in which the reaction mixture also contains water.

4. The process of claim 1 in which the reaction mixture contains a polymerization catalyst and the catalyst is an oxygenated phosphorus acid or a salt of an oxygenated phosphorus acid.

5. The process of claim 1 in which the diamine component is present in an amount that is stoichiometrically in excess of the amount of aromatic diacid.

6. The process of claim 1 in which the diamine component additionally includes an aliphatic diamine, and the aliphatic diamine is hexamethylenediamine.

* * * * *